United States Patent
Bodendorf et al.

(10) Patent No.: US 12,013,024 B2
(45) Date of Patent: Jun. 18, 2024

(54) CONNECTION DEVICE FOR A TRANSMISSION VENT

(71) Applicant: Bayerische Motoren Werke Aktiengesellschaft, Munich (DE)

(72) Inventors: Frank Bodendorf, Kaufering (DE); Moritz Hoescheler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 12 days.

(21) Appl. No.: 17/793,448

(22) PCT Filed: Jan. 19, 2021

(86) PCT No.: PCT/EP2021/050986
§ 371 (c)(1),
(2) Date: Jul. 18, 2022

(87) PCT Pub. No.: WO2021/164967
PCT Pub. Date: Aug. 26, 2021

(65) Prior Publication Data
US 2023/0120104 A1    Apr. 20, 2023

(30) Foreign Application Priority Data
Feb. 18, 2020  (DE) .................... 10 2020 104 170.5

(51) Int. Cl.
*F16H 57/02*    (2012.01)
*F16H 57/027*    (2012.01)
(Continued)

(52) U.S. Cl.
CPC .......... *F16H 57/027* (2013.01); *F16L 37/096* (2013.01); *F16L 37/1205* (2013.01)

(58) Field of Classification Search
CPC .... F16H 57/027; F16L 37/096; F16L 37/1205
See application file for complete search history.

(56) References Cited

U.S. PATENT DOCUMENTS 1,530,651 A    3/1925 Corbett
4,722,555 A *  2/1988 Soultatis ................ F16L 37/20
                                                    285/133.11
(Continued)

FOREIGN PATENT DOCUMENTS

CN    2382934 Y    6/2000
CN    1708657 A    12/2005
(Continued)

OTHER PUBLICATIONS

International Search Report (PCT/ISA/210) issued in PCT Application No. PCT/EP2021/050986 dated Mar. 31, 2021 with English translation (four (4) pages).
(Continued)

*Primary Examiner* — Adam D Rogers
(74) *Attorney, Agent, or Firm* — Crowell & Moring LLP

(57) ABSTRACT

A connection device for a ventilation element includes a transmission connection and a vent connection, the vent connection connects the connection device to a ventilation element, the component connection has a connection piece extending along a connecting axis, and a torsion ring surrounding the connection piece. A connecting rocker is arranged on the torsion ring, and the torsion ring is connected to the connection piece by a connecting bridge, and the connecting rocker has an actuation section and an engaging section for forming an interlocking connection. The torsion ring runs between the actuation section and the engaging section in a connecting region, in which it is connected to the connecting rocker, and the connecting bridge has a connecting arm, which starts from the connection piece and extends in the direction of the connecting axis up to the torsion ring and retains same at a radial distance from the connection piece.

9 Claims, 2 Drawing Sheets

(51) Int. Cl.
*F16L 37/096* (2006.01)
*F16L 37/12* (2006.01)

(56) References Cited

U.S. PATENT DOCUMENTS

| | | | | |
|---|---|---|---|---|
| 5,129,422 | A | * | 7/1992 | Davison, Jr. .......... F16H 57/027 33/727 |
| 11,512,769 | B2 | * | 11/2022 | Koerber ................ F16H 57/027 |
| 11,592,131 | B2 | * | 2/2023 | Derom .................. F16L 37/133 |
| 2004/0232696 | A1 | | 11/2004 | Andre |
| 2006/0103133 | A1 | | 5/2006 | Moretti et al. |
| 2011/0037252 | A1 | | 2/2011 | Brandt et al. |
| 2012/0119485 | A1 | | 5/2012 | Cichorek et al. |

FOREIGN PATENT DOCUMENTS

| | | | | |
|---|---|---|---|---|
| CN | 102472424 | A | | 5/2012 |
| CN | 203604595 | U | | 5/2014 |
| CN | 104343941 | A | | 2/2015 |
| CN | 105889471 | A * | 8/2016 | .......... F16H 57/027 |
| CN | 106594241 | A | | 4/2017 |
| CN | 208348750 | U | | 1/2019 |
| CN | 109505961 | A * | 3/2019 | .......... F16H 57/027 |
| CN | 209370665 | U | | 9/2019 |
| DE | 20 2008 005 929 | U1 | | 10/2009 |
| DE | 10 2017 125 603 | A1 | | 5/2019 |
| DE | 102019122617 | A1 * | 2/2021 | |
| DE | 102019008935 | A1 * | 6/2021 | |
| DE | 102019218415 | A1 * | 6/2021 | |
| EP | 0 404 361 | A1 | | 12/1990 |
| FR | 1 364 735 | A | | 6/1964 |
| FR | 2 703 128 | A1 | | 9/1994 |
| GB | 394937 | A | | 7/1933 |
| JP | 2017067249 | A * | 4/2017 | .............. F16L 25/06 |
| WO | WO 94/23236 | A1 | | 10/1994 |

OTHER PUBLICATIONS

German-language Written Opinion (PCT/ISA/237) issued in PCT Application No. PCT/EP2021/050986 dated Mar. 31, 2021 (eight (8) pages).

German-language Search Report issued in German Application No. 10 2020 104 170.5 dated Dec. 16, 2020 with partial English translation (nine (9) pages).

Chinese-language Office Action issued in Chinese Application No. 202180007319.5 dated Dec. 6, 2023, with English translation (18 pages).

\* cited by examiner

CONNECTION DEVICE FOR A TRANSMISSION VENT

BACKGROUND AND SUMMARY

The invention relates to a connection device for an aeration and venting element for use with an automotive drive. Connection devices are known in various designs, DE 20 2008 005 929 U1 being concerned with a connection apparatus for a media line in the region of a wall guide and with a wall element.

The invention is described below in connection with a transmission venting means at an automotive transmission. In particular owing to fluctuating temperatures, as occur during the operation of a transmission, the transmission interior space has a connection for exchange of air with the surroundings. Here, although air is to pass out of and into the transmission, neither impurities nor moisture are/is to pass into the transmission. To solve this problem, transmissions have a so-called transmission venting means, which, as a so-called "membrane venting means", is commonly equipped with a gas-permeable but liquid-impermeable membrane. Such venting means, in particular in the case of automotive transmissions, which are produced in large quantities, are to be quickly mountable/dismountable but must also be accommodated securely at the transmission.

Connection devices for forming a latching connection are known from the prior art, in particular from DE 20 2008 005 929 U1. It is an object of the invention to specify a connection device for an aeration and venting element, a so-called ventilation element, with improved mountability in comparison with connection devices known from the prior art, said object being achieved by an article according to the first patent claim.

A connection device for a ventilation element, in particular a transmission venting means, is to be understood as meaning a device which is configured to connect a drive component in a drive train, in particular a transmission, to said ventilation element. Preferably, the ventilation element is in the form of a membrane venting means, and further preferably this can be connected to the connection device and is preferably formed in one piece therewith. The connection device has a connection piece for forming the connection between the ventilation element and the drive component, in particular the interior space of the transmission.

Furthermore, said connection piece, and thus the connection device, has a component connection, and further preferably the connection device has the component connection and a venting-means connection. Preferably, these two connections are arranged at oppositely situated axial ends of the connection piece, wherein the connection piece extends along a connecting axis in an axial direction, preferably between these two axial ends.

Preferably, the venting-means connection is configured for connection of the connection device to a transmission venting means, and further preferably the connection device is connected in one piece to this ventilation element or to a housing of the ventilation element. Preferably, the venting-means connection is connected in a materially bonded manner, and preferably in a form-fitting manner, to the ventilation element. Furthermore, the connection device has the connection piece, which extends along the connecting axis. For forming a form-fitting connection to a media line which leads to the drive component, in particular therefore to an interior space of a drive component that is to be aerated/vented, the component connection has a torsion ring which surrounds the connection piece.

Within the context of the invention, "venting" is to be understood in this context as meaning setting up of a possibility for equalization of pressure between the interior space of the drive component that is to be ventilated and an environment surrounding the system. Owing to fluctuating temperatures and an inherently closed interior space, it is, in particular in the case of transmissions, common to connect the interior space to a device, a so-called venting means or transmission venting means (ventilation element), wherein said device makes possible exchange of air between the interior space, in particular therefore the transmission interior space, and the surrounding environment. Furthermore, such a ventilation element is designed in such a way that air, that is to say gas, can pass through it, but impurities and moisture are kept back by it, in particular cannot enter the interior space through the ventilation element. Preferably, the use of the invention with a ventilation element which is in the form of a so-called membrane venting means is provided.

Furthermore, on the torsion ring, there is arranged at least one single connecting rocker having a latching section, the latter being configured to form a form-fitting connection to a corresponding counterpart, in particular to the media line leading to the system to be vented. Further preferably, the connecting rocker is actuatable, preferably actuatable manually and in particular for releasing or eliminating this form-fitting connection. Here, actuation is to be understood in this context as meaning that the actuation section can be moved radially inward and this form-fitting connection can thus be released without a tool. In other words, this latching section on the connecting rocker is configured for forming a latching connection, and further preferably the connecting rocker has the actuation section for releasing said connection. Further preferably, the torsion ring is formed as a ring which passes around the connecting axis, and preferably as one which passes around the outside of the connection piece, and which resiliently receives the connecting rocker in the connecting section.

Further preferably, the torsion ring is connected to the connection piece by means of a connecting bridge, and preferably the connection piece, the connecting bridge and the torsion ring are formed in one piece with one another. Preferably, the connecting rocker has the actuation section and the latching section, wherein the latching section may also be regarded as a latching nose. Preferably, the connecting rocker is formed here in such a way that the actuation section performs a, preferably radially inward, movement according to plan when an actuating force, in particular a manual actuating force, which can be applied to the actuation section without a tool, is applied. Further preferably, said movement of the actuation section leads to a radially outward movement of the latching section. Preferably, the connecting rocker may be understood as being a continuous lever, or rocker, with the actuating section arranged on one end thereof and the latching section arranged on the other end thereof.

Further preferably, the connecting rocker is connected in a connecting region to the torsion ring, preferably in one piece therewith. Preferably, geometrically, the connecting region of the connecting rocker is arranged between the actuation section and the latching section. Figuratively speaking, the torsion ring thus serves as a hinge device for the connecting rocker and preferably as a combined hinge-and-spring device, it thus being the case that if the connecting rocker is acted on by an actuating force in the actuation section, a torsional stress is exerted on the torsion ring, and if by contrast the actuating force is discontinued again, the torsion ring, and thus the connecting rocker, springs back into its original position again.

Further preferably, the connecting bridge has at least one single connecting arm, it further preferably being the case that each connecting rocker has such a connecting arm adjacent to it in each case.

Within the context of the invention, a connecting arm is to be understood as meaning a web for connecting the torsion ring to the connection piece, and further preferably the connecting arm extends from the connection piece as far as the torsion ring. Preferably, the at least one connecting arm extends from the connection piece as far as the torsion ring at least sectionally in the direction of the connecting axis. Preferably, the connecting arm holds the torsion ring spaced apart from the connection piece. In particular with such a configuration, it is ensured that the torsion ring passes "freely" around the connection piece and the connecting rocker is held "resiliently" by said torsion ring, and consequently the formation of a latching connection to a suitable counterpart, and the elimination thereof without a tool, via an actuating force on the actuation region of the connecting rocker is made possible.

In particular by way of such a configuration, secure "latching" of the latching section of the connecting rocker into a suitable counterpart for forming a form-fitting connection is made possible, on the one hand, and simple releasing of said connection by way of the actuation section on the connecting rocker is also made possible, on the other hand, and in this way simple mounting and dismounting of the connection device can be provided.

In a preferred embodiment, the connection device has two connecting rockers, and preferably a multiplicity of connecting rockers. In particular two connecting rockers make possible a simple release of a form-fitting connection, and with a multiplicity of connecting rockers, a particularly secure form-fitting connection is made possible. Further preferably, the at least two connecting rockers are connected to said torsion ring, and furthermore these are arranged oppositely on the torsion ring, that is to say with a 180° offset from one another. In particular such an arrangement of two connecting rockers, makes simple operability possible.

In a preferred embodiment of the connection device with two connecting rockers, the torsion ring is held on the connection piece by two connecting arms. Preferably, the connecting arms and connecting rockers are arranged in a alternating manner on the torsion ring in relation to the circumferential direction. Further preferably, both the connecting arms and the connecting rockers are in each case arranged oppositely on the connection piece. Figuratively speaking, the connecting arms and the connecting rockers are arranged on the connection piece in an alternating manner and at least substantially so as to be offset by 90° in each case around the connecting axis. In particular such a configuration has good operability of the connection device and thus makes possible simple mounting/dismounting without a tool.

In a preferred embodiment, the connection piece has an outer surface. Preferably, the connection piece is at least sectionally in the form of an annularly cylindrical tube, wherein the connecting axis forms the cylinder axis of said tube. Further preferably, the outer surface is to be understood as meaning the outer cylinder lateral surface of said tube, and further preferably a recess, a so-called sealing-ring groove or seal section, is formed on this surface or in this surface. Preferably, the recess is configured for receiving a seal element and, preferably, for receiving an O-ring. Preferably, the recess is in the form of a radially encircling groove in the connection piece. Preferably, said recess is arranged between the latching section of the connecting rocker and the actuation section of the connecting rocker in an axial direction. Further preferably, said recess, for an orientation of the connection device in which the actuation section is oriented toward the top and the latching section is oriented toward the bottom, is arranged at least sectionally and preferably completely above the latching section. In particular with such a configuration, a particularly secure form-fitting connection is made possible since a seal element inserted into the recess applies a force radially outwardly to a media line to be connected to the connection device, and in this way the secureness of the latching connection is improved.

Furthermore, a drive-component venting apparatus, in particular a transmission venting apparatus, which has a connection device according to one of the above-described embodiments is proposed. Preferably, in the case of such a venting apparatus, the connection piece of the connection device is connected in a fluid-conducting manner at a first axial end to a venting element, in particular therefore to a transmission venting means. Preferably, the venting element is in the form of a so-called membrane venting means and, for making possible equalization of pressure between an interior space of the drive component and an environment surrounding this, has a membrane composed of a preferably gas-permeable but water-impermeable membrane. Further preferably, the connection device has at least one of said connecting rockers and preferably at least two of said connecting rockers, wherein said connecting rocker(s) is/are configured for forming a form-fitting connection to a media line which is connected to a drive-component interior space. Further preferably, said media line is connected to a second axial end of the connection piece, in particular to the component connection, and has at least one latching recess, which is configured such that the latching section of the connecting rocker engages into it for the purpose of forming the form-fitting connection.

In particular for releasing "without a tool" the above-described form-fitting connection, the actuation section of the connecting rocker is moved radially inward by means of a manual force, wherein a manual force is to be understood in this context as meaning a force of 20 newtons or less, preferably of 10 newtons or less. As a result of the manual force, the torsion ring is twisted and the latching section moves radially outward counter to the actuation section and, figuratively, is lifted out of the latching recess of the counterpart, in particular of the media line. In particular such a connection has good mountability and dismountability.

An embodiment of the connection device and individual features thereof are discussed in more detail below on the basis of the figures.

DETAILED DESCRIPTION

Figure 1:
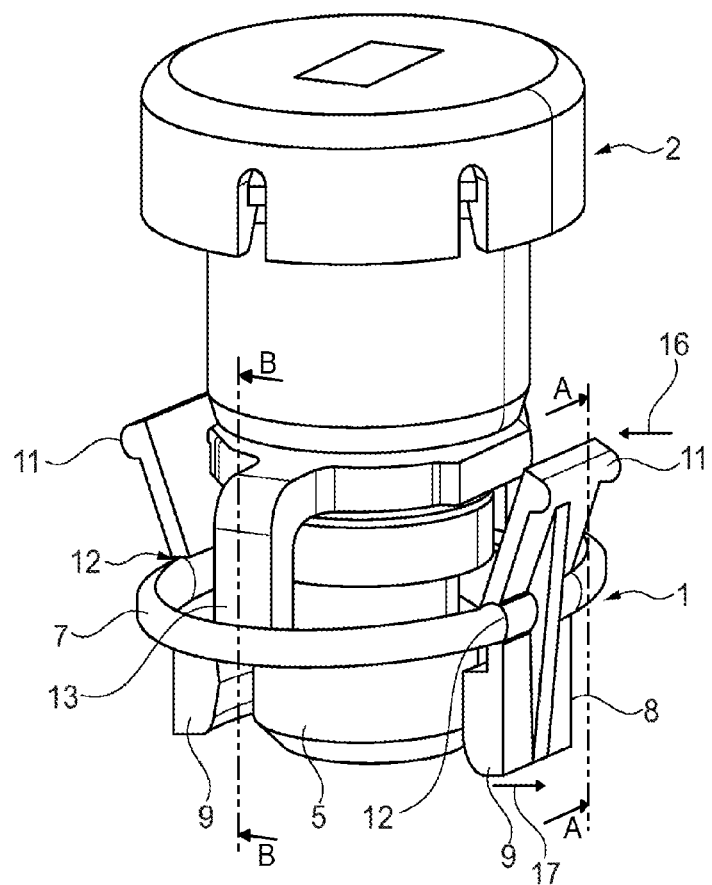
FIG. 1 shows a perspective view of a transmission venting apparatus.

FIG. 1 shows a perspective view of a venting apparatus having a transmission vent and having the described connection device, this consequently forming a transmission venting apparatus having a connector 1 and having a transmission vent 2. The transmission vent 2 is connected to the connector 1. The connector has the torsion ring 7, which is held on the connection piece 1 via the connecting arm 13. The torsion ring 7 is connected in the connecting region 12 to the connecting rocker 8, which has the actuation section 11 and the latching section 9. A connector 1 having two connecting rockers 8 is illustrated. If a sufficiently large actuating force is applied to the actuation section 11, then the latter moves radially inward in the direction 16, while the latching section 9 moves radially outward in the direction 17. During a movement in the direction 17, the latching section is lifted out of a latching recess (not illustrated) and, in this way, the latching connection is released without a tool.

Figure 2:
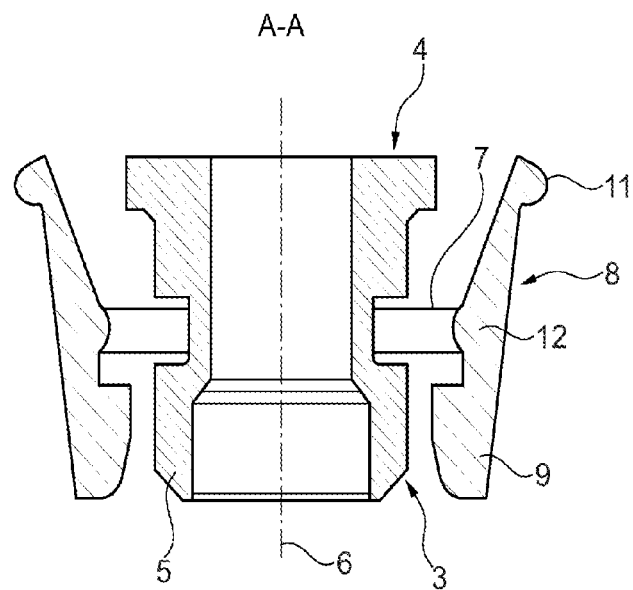
FIG. 2 shows a first sectional illustration of the connection device.

FIG. 2 shows a sectional illustration of the connection device, wherein the section extends through the two connecting rockers 8, which are thus illustrated in section. It can be seen that the two connecting rockers 8 are arranged oppositely on the connection piece 5 and are connected in the connecting region 12 to the torsion ring 7. The connection piece is substantially in the form of an annularly cylindrical tube and extends along the connecting axis 6 between the vent connection 4 (at the top in the figure) and the transmission connection 3 (at the bottom in the figure).

Figure 3:
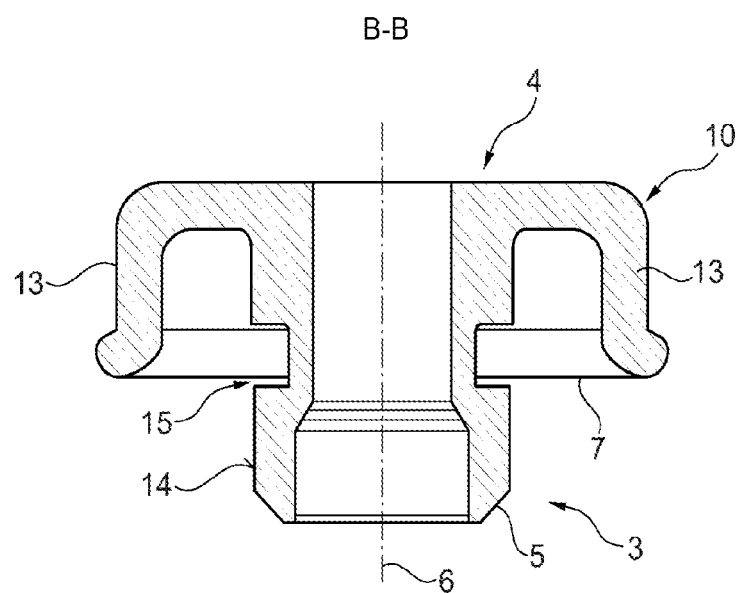
FIG. 3 shows a second sectional illustration of the connection device.

FIG. 3 illustrates the same connection device as is illustrated FIG. 2, the section plane being rotated through 90° in this figure however, so that the section extends not through the connecting rockers, as in FIG. 2, but through the two connecting arms 13 of the connecting bridge 10. The connection device is illustrated with the same orientation in relation to the vent connection 4 (at the top) and the transmission connection 3 (at the bottom) as in FIG. 2. The torsion ring 7 is held by the two connecting arms 13 and extends radially at the outside around the connecting axis 6 and the connection piece 5. The seal section 15 is formed as a radially encircling groove in the outer surface 14 of the connection piece for the purpose of receiving a seal element.

In relation to this illustration, the seal section 15 is formed completely above the latching section 9 in the direction of the connecting axis 6, this being shown in particular in FIG. 2.

LIST OF REFERENCE SIGNS

1 Connection device
2 Transmission vent/ventilation element
3 Transmission connection/component connection
4 Vent connection
5 Connection piece
6 Connecting axis
7 Torsion ring
8 Connecting rocker
9 Latching section
10 Connecting bridge
11 Actuating section
12 Connecting region
13 Connecting arm
14 Outer surface of 5
15 Seal section
16 Radially inward direction
17 Radially outward direction

The invention claimed is:

1. A connection device for a ventilation element comprising:
a component connection; and
a venting connection,
wherein the venting connection is configured to connect the connection device to a ventilation element, and
wherein the component connection has a connection piece which extends along a connecting axis and the component connection furthermore has a torsion ring which surrounds the connection piece,
wherein at least one connecting rocker is arranged on the torsion ring and the torsion ring is furthermore connected to the connection piece by a connecting bridge and the at least one connecting rocker has an actuation section and a latching section for forming a form-fitting connection,
wherein the torsion ring, in a connecting region in which said torsion ring is connected to the at least one connecting rocker, extends between the actuation section and the latching section,
wherein the connecting bridge has at least one connecting arm, which extends from the connection piece and extends in the direction of the connecting axis as far as the torsion ring and holds the torsion ring spaced apart radially from the connection piece,
wherein the connection piece has an outer surface, and
wherein at least one seal section is arranged, and formed as a recess, on said outer surface.

2. The connection device according to claim 1, wherein the at least one connecting rocker is comprised of two connecting rockers, and wherein the two connecting rockers are connected to the torsion ring and are arranged oppositely from each other on the connection piece.

3. The connection device according to claim 1, wherein the at least one connecting arm is comprised of two connecting arms, and wherein the torsion ring is held on the connection piece by the two connecting arms by way of the connecting bridge,
wherein the connecting arms are arranged oppositely on the connection piece,
wherein the at least one connecting rocker is comprised of two connecting rockers, and
wherein the two connecting arms and the two connecting rockers are arranged on the connection piece in an alternating manner and in each case so as to be offset by 90° around the connecting axis.

4. The connection device according to claim 1, wherein the seal section is in the form of a radially encircling groove.

5. A drive-component venting apparatus comprising:
the connection device according to claim 1,
wherein the connection piece, at a first axial end, is connected in a fluid-conducting manner to a ventilation component, and
wherein the at least one connecting rocker and a second axial end of the connection piece are configured to form a form-fitting connection to a media conduit.

6. A connection device for a ventilation element comprising:
a component connection; and
a venting connection,
wherein the venting connection is configured to connect the connection device to a ventilation element, and
wherein the component connection has a connection piece which extends along a connecting axis and the component connection furthermore has a torsion ring which surrounds the connection piece,
wherein at least one connecting rocker is arranged on the torsion ring and the torsion ring is furthermore connected to the connection piece by a connecting bridge and the at least one connecting rocker has an actuation section and a latching section for forming a form-fitting connection, wherein the torsion ring, in a connecting region in which said torsion ring is connected to the at least one connecting rocker, extends between the actuation section and the latching section, and wherein the connecting bridge has at least one connecting arm, which extends from the connection piece and extends in the direction of the connecting axis as far as the torsion ring and holds the torsion ring spaced apart radially from the connection piece, wherein the at least one connecting arm is comprised of two connecting arms, and wherein the torsion ring is held on the connection piece by the two connecting arms by way of the connecting bridge, wherein the connecting arms are arranged oppositely on the connection piece, wherein the at least one connecting rocker is comprised of two connecting rockers, and wherein the two connecting arms and the two connecting rockers are arranged on the connection piece in an alternating manner and in each case so as to be offset by 90° around the connecting axis.

7. The connection device according to claim 6, wherein the at least one connecting rocker is comprised of two connecting rockers, and wherein the two connecting rockers are connected to the torsion ring and are arranged oppositely from each other on the connection piece.

8. The connection device according to claim 6, wherein the connection piece has an outer surface, wherein at least one seal section is arranged, and formed as a recess, on said outer surface, and wherein the seal section is in the form of a radially encircling groove.

9. A drive-component venting apparatus comprising:

the connection device according to claim 6, wherein the connection piece, at a first axial end, is connected in a fluid-conducting manner to a ventilation component, and wherein the at least one connecting rocker and a second axial end of the connection piece are configured to form a form-fitting connection to a media conduit.

* * * * *